United States Patent [19]
Cagle et al.

[11] 3,964,565
[45] June 22, 1976

[54] HIGH CLEARANCE VEHICLE WHEEL SPACING ADJUSTMENT

[75] Inventors: Wesley J. Cagle; Ronald F. Hodge, both of Huntsville, Ala.

[73] Assignee: John Blue Company Division of Subscription Television, Inc., New York, N.Y.

[22] Filed: July 18, 1974

[21] Appl. No.: 489,714

[52] U.S. Cl. .............................. 180/70 R; 180/1 F; 180/21; 180/89 R; 280/638; 280/80 B; 280/96.1
[51] Int. Cl.² ................... B62D 21/14; B62D 61/00
[58] Field of Search .............. 280/34 R, 34 A, 80 B, 280/96.1; 180/21, 1 F, 70 R

[56] References Cited
UNITED STATES PATENTS

| | | | |
|---|---|---|---|
| 2,504,403 | 4/1950 | Finley | 280/34 R X |
| 2,681,231 | 6/1954 | Kondracki | 280/34 R X |
| 2,701,022 | 2/1955 | Chestnutt | 180/26 R |
| 2,788,858 | 4/1957 | Aasland | 180/1 F X |
| 2,822,216 | 2/1958 | Finley | 180/26 R X |
| 3,126,209 | 3/1964 | Jewell | 280/80 B |
| 3,146,000 | 8/1964 | Holzman | 280/80 B |
| 3,154,164 | 10/1964 | Shaw et al. | 180/1 F X |
| 3,236,324 | 2/1966 | Leuratto | 180/46 |
| 3,556,545 | 1/1971 | Van Raden | 280/34 A |

*Primary Examiner*—M. H. Wood, Jr.
*Assistant Examiner*—John P. Silverstrim
*Attorney, Agent, or Firm*—Cushman, Darby & Cushman

[57] ABSTRACT

A self-propelled high clearance machine for agricultural uses such as a sprayer having laterally adjustable drop axle wheel support means that may be positioned in a number of different settings to adapt the sprayer for universal use in the spraying of different crops that have been planted with variations in the width or spacing between their rows.

11 Claims, 5 Drawing Figures

HIGH CLEARANCE VEHICLE WHEEL SPACING ADJUSTMENT

BACKGROUND OF THE INVENTION

Self-propelled high clearance spraying equipment has been developed in the past for treating row crops and depending upon the particular crop being raised, a different spacing is provided between the rows of the crop planted in the field. In order to provide a spraying vehicle that is universally adaptable to the spraying of all such various crops, it is sometimes necessary to vary the spacing between the ground engaging wheels so that the wheels will fit the row spacing for the particular crop and various proposals have been made for such equipment.

One example of a machine having laterally adjustable wheels is included in the patent to Levrateo, U.S. Pat. No. 3,236,324 dated Feb. 22, 1966. This machine includes means for adjusting front and rear wheels laterally including hydraulic cylinder means cooperating with the wheel support means to drive the wheels in or out as the vehicle is moved along the ground. Another disclosure of a similar type of mechanism is included in the patent to Connor, U.S. Pat. No. 243,216 dated June 23, 1881.

Other patents showing various ways for adjusting the spacing between wheels are the following: U.S. Pat. No. 2,563,372 to Risse, Aug. 7, 1951; U.S. Pat. No. 2,604,332 to Kent, July 22, 1952; U.S. Pat. No. 2,678,746 to Gibson, May 18, 1954; U.S. Pat. No. 2,767,995 to Stout, Oct. 23, 1956; and U.S. Pat. No. 3,532,307 to Larson, Oct. 6, 1970.

BRIEF DESCRIPTION OF THIS INVENTION

The present invention provides a wheel mounting structure for self-propelled high clearance sprayer that may be quickly and easily adjusted by moving the wheel mounting means laterally to shift the wheels to accommodate different row crops having different spacing between the rows. The invention makes use of a simple drop axle mounting structure which includes bearings means for permitting easy lateral adjustment of the wheel and locking means that is activated after the adjusted position has been attained for holding the drop axle fixed relative to the vehicle, with the bearing means out of contact with the bearing tracks while the machine is being used in the field. The vehicle includes a platform upon which the operative elements of the vehicle are mounted, including an engine, tanks for the storage of chemical fluids being applied to the crops and a station for the operator with steering and other control means handy. The drop axles are suspended from the platform by means of a structure including a suitable rigid housing means integral with platform adjacent each drop axle and a frame that moves telescopically in and out of the housing to accomplish the desired lateral adjustment. Suitable bearing means coacting between the frame and housing are provided to permit easy movement of the frame within the housing. After the wheels at the lower ends of the drop axles have been moved to their respective adjusted positions, clamp means are activated for engagement between the housing and the slidable frame structure to cause the frame to be moved slightly whereby to positively align the movable frame with the fixed housing and also retract the bearing means from contact with their respective bearing tracks. The clamping means further rigidifies the frame within the housing so that a good solid support arrangement is provided between the ground engaging wheels and the platform upon which the operator rides and from which he directs treatment of the crop.

The invention includes means for permitting continuous engagement between the driving means for the ground engaging wheels and the drive motor on the platform during and after adjustment of the wheels to a desired position. There are also provided means for quick adjustment of the tie rod in the steering system for connecting the front wheels together to enable the vehicle to be steered through the field. The invention provides for a one-man operation whereby lateral adjustment of the wheels can be very simply accomplished with the aid of a small hydraulic motor operated from the platform and by the use of which all of the wheels on the high clearance spray vehicle can be easily and quickly adjusted to provide the desired width of wheel track for movement through a row crop of any particular spacing.

DETAILED DESCRIPTION

A preferred form of the invention is shown in the drawings, wherein.

Figure 1:
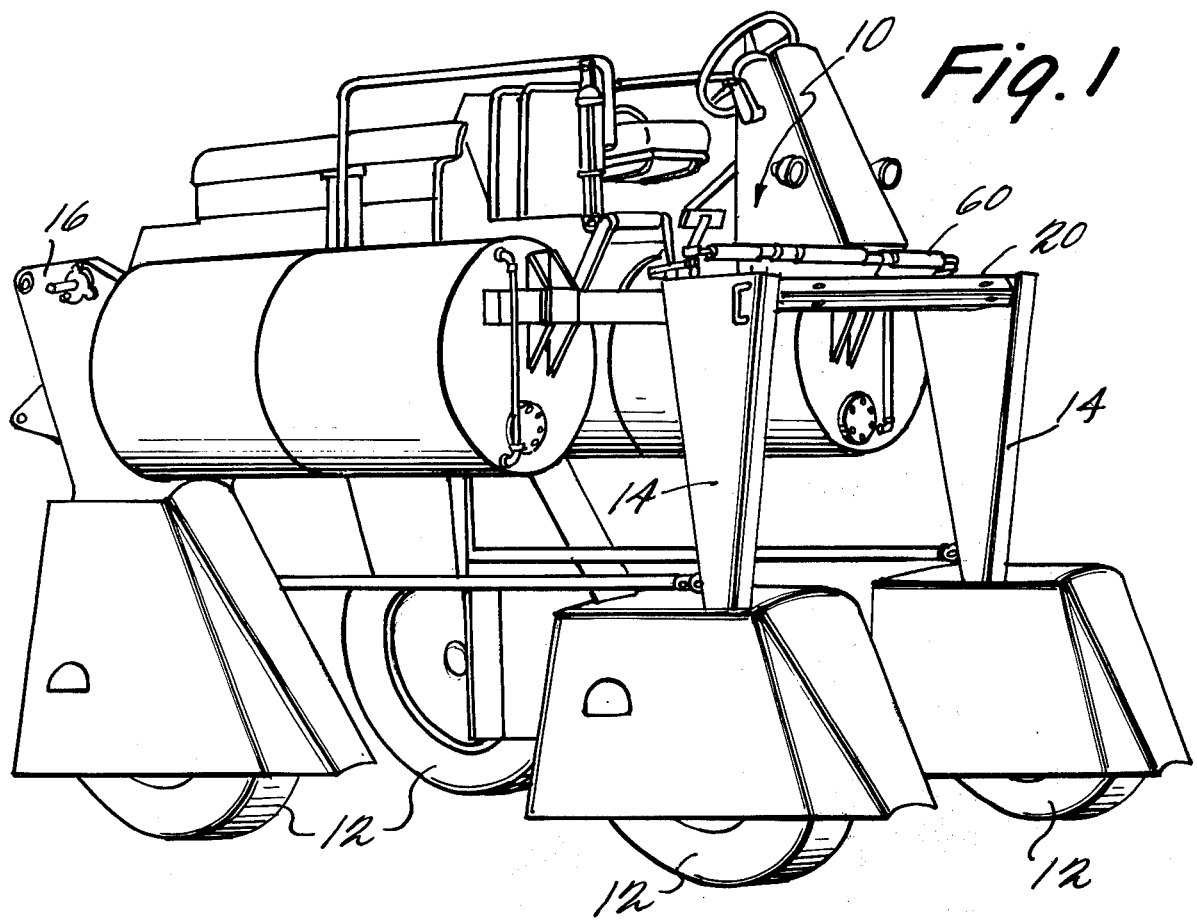
FIG. 1 is a perspective view of a vehicle equipped with this invention.

Referring to FIG. 1, the self-propelled high clearance vehicle has a platform generally indicated at 10 which is supported on a plurality of ground engaging wheels 12 which are rotatably mounted at the ends of drop axles 14 and 16. Drop axles 14 support the front wheels and drop back axles 16 support the rear wheels. The vehicle is designed to move through row crops and for this purpose, the front wheels 12 and the rear wheels are designed to be adjusted laterally to accommodate the width of their track to the spacing between crops planted in rows that may vary in their spacing depending upon the particular crop.

The platform is designed to carry the operating station where the driver sits at the steering wheel and the platform also supports suitable tanks for carrying chemicals to be sprayed, spraying apparatus and a motor for driving the spraying pumps and the ground engaging wheels to traverse the vehicle through the field, as well as all the other equipment normally provided on such machines including a hydraulic pump and motor for adjusting the drop axles as described below.

The platform 10 is carried well above the tops of the plants forming the row crop to be treated and the drop axles depend downwardly therefrom so that the wheels can roll in the space between the rows. The drop axles would normally be set for a crop set in rows 80 inches apart, but the drop axles are adjustable laterally with respect to the platform or at right angles to the longitudinal center line of the platform to position the wheels to pass between rows of crops set at a distance more or less than the 80 inches normally encountered. For this purpose, each of the drop axle means is supported from an integral frame element carried at the upper end thereof that is designed to telescopically fit somewhat loosely in an enclosed housing means integrally mounted adjacent to the front and rear ends of the platform.

Figure 2:
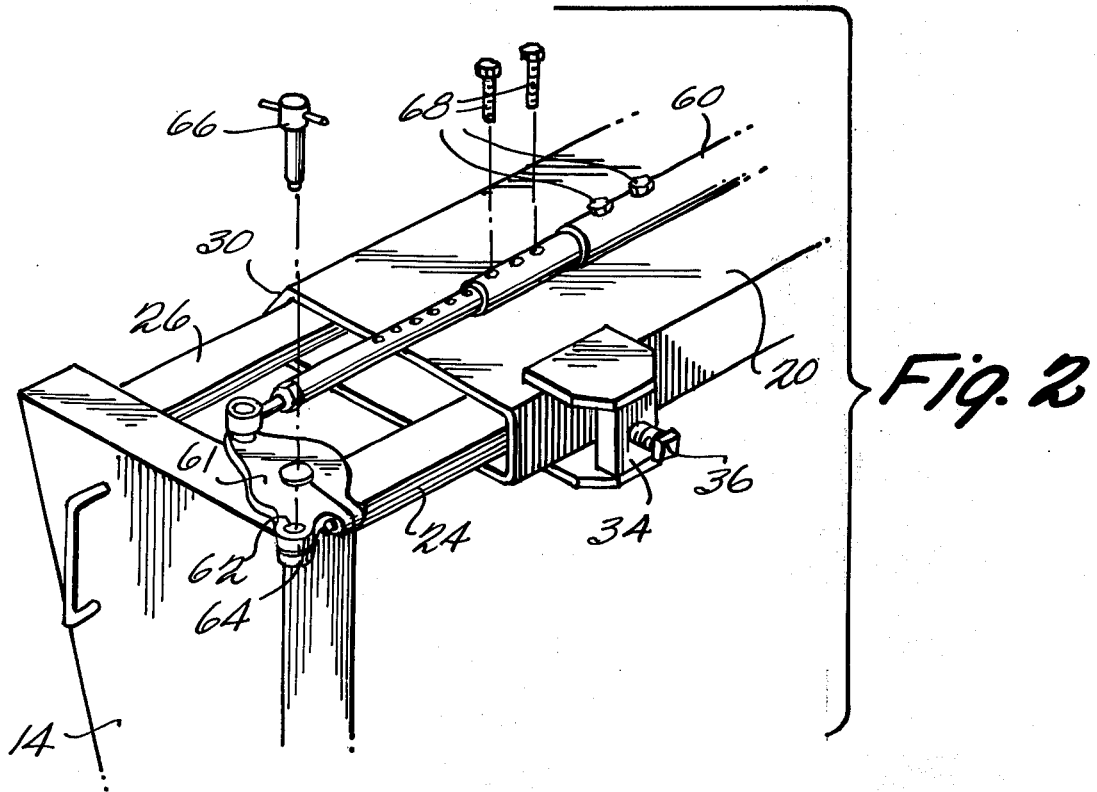
FIG. 2 is a perspective view looking from the rear of the vehicle toward a laterally adjustable drop axle structure for a front wheel.

Referring to FIG. 2, the details of such a structure are shown for a front wheel and viewing it from the rear, it includes the housing 20 which extends laterally across the entire front end of the platform, (see FIG. 1). Housing 20 has a relatively long dimension longitudinally in the direction of travel of the vehicle to support a drop axle 14 at each end, each of which drop axles supports a ground engaging wheel 12 at its lower end. At the upper end the drop axles 14 each include the rigid frame that slides telescopically in and out of the housing for adjusting the width between the wheels and is adapted to be clamped integral with the housing when the vehicle moves through the field. The frame integral with the drop axle takes the form of square tubular members 24 and 26 connected integrally with the drop axle at one end, the inner free ends of members 24 and 26 being joined by crossbar 28. The tubes 24 and 26 are spread apart longitudinally a distance to rather closely fit within the confines of housing 20 so that the frame formed by tubular bars 24, 26, and 28 may be slid laterally in and out of the housing on bearings as described below, to adjust the width of the wheel spacing and can thereafter be clamped tightly against the inside walls of the housing to hold the drop axle means fixed relative to the platform when the desired adjustment has been made to disengage the bearings from their tracks.

Figure 3:
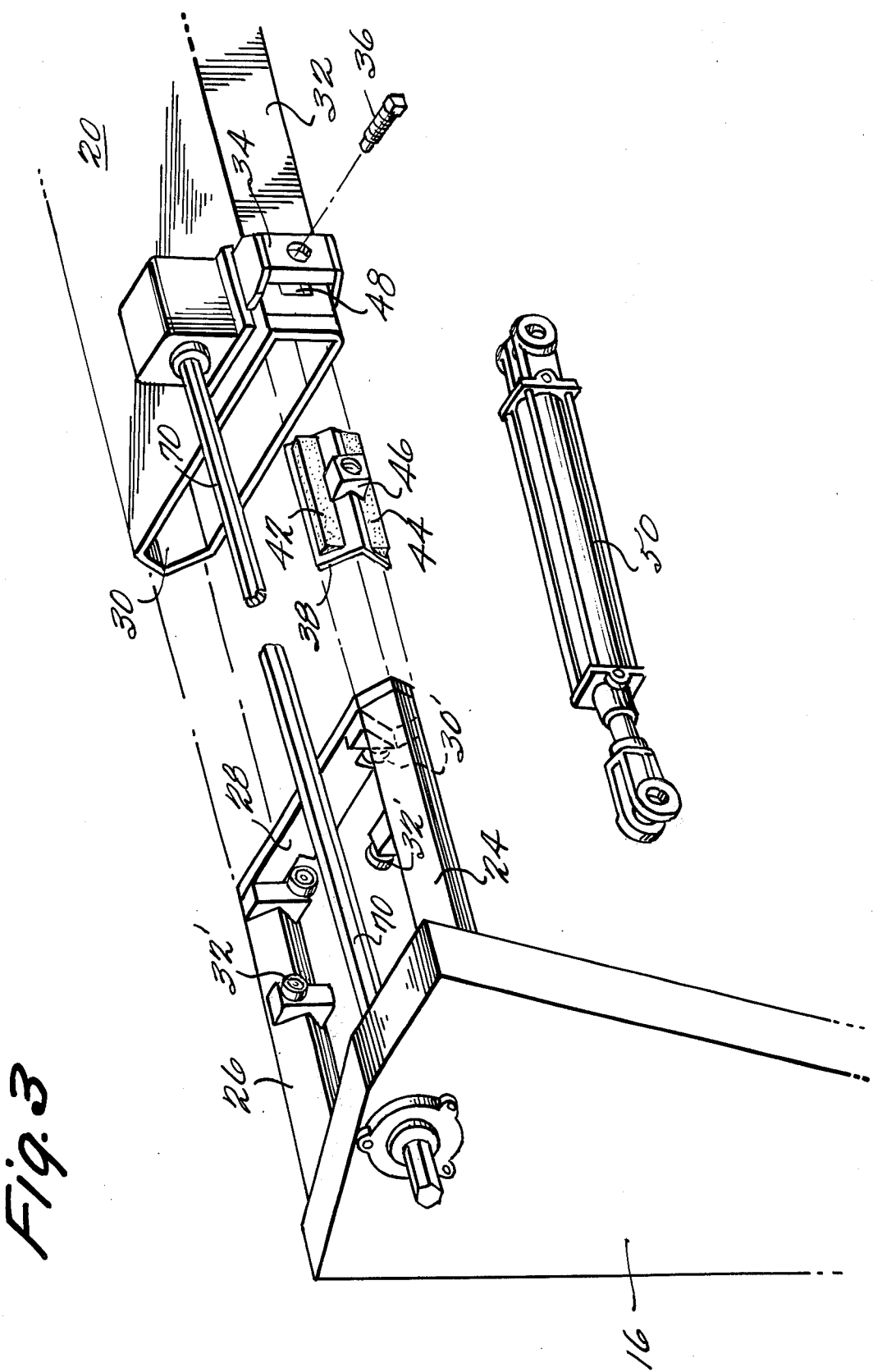
FIG. 3 is an exploded view showing an adjustable drop axle structure for a rear wheel of the vehicle.
Figure 4:
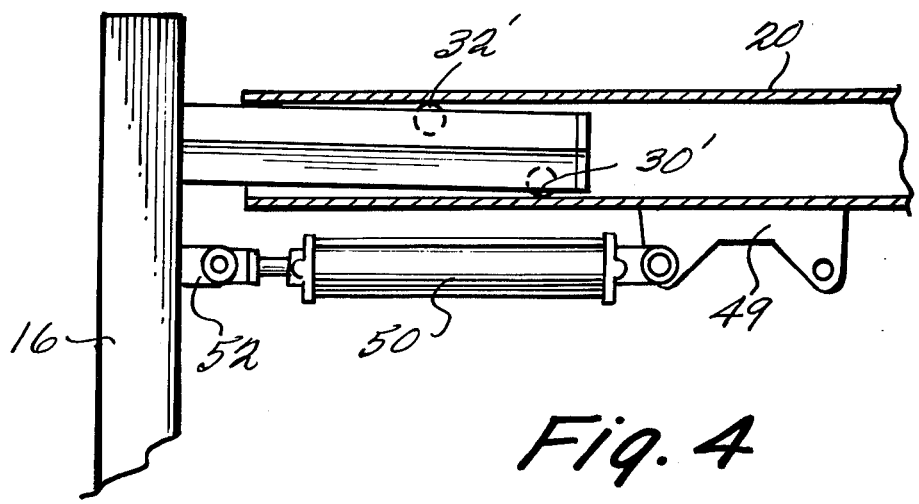
FIG. 4 is a sectional view, partly broken away looking from an end of the vehicle at a drop axle carried in a housing for adjustment laterally.
Figure 5:
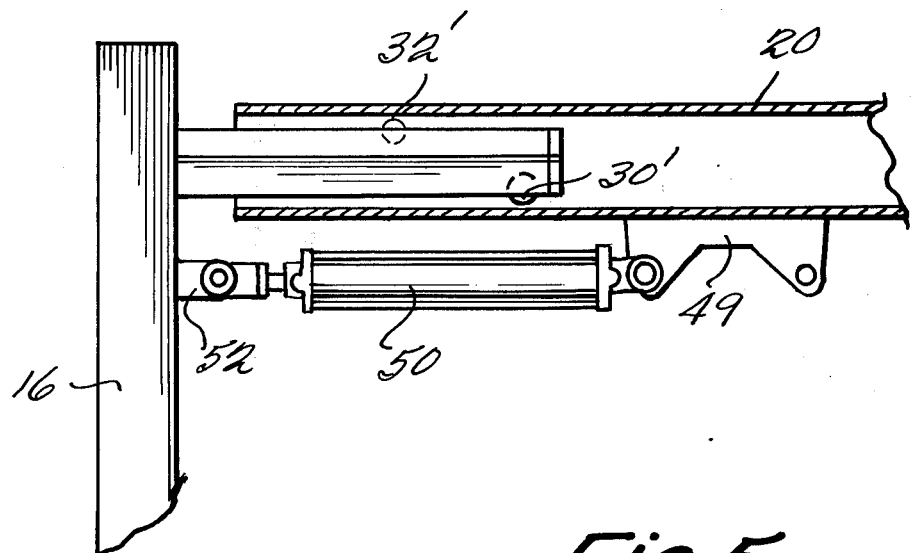
FIG. 5 is a sectional view showing the structure of FIG. 4 with the drop axle clamped to the housing for driving the vehicle through a field.

The rear drop axle means are supported from platform 10 by an identical housing and frame means and it will be seen in FIG. 3 that the rear drop axle means each includes a frame having two spaced bars 24 and 26 joined by bar 28, the bars 24 and 26 each supporting laterally and vertically pairs of spaced apart roller bearings 30' and 32' that are normally locked in a suspended position as shown in FIG. 5 since the vertical distance between bearings 30' and 32' is less than the distance between the top and bottom walls of housing 20. The roller bearings 30' are positioned adjacent the lower portion of members 24 and 26 and are spaced inwardly nearer the longitudinal center of the platform while roller members 32' are positioned adjacent the upper portion of bearings 24 and 26 and are spaced relatively outwardly from the longitudinal center of the platform and the lower bearing means 30'. For lateral adjustment of the drop axle, the bearings 30' and 32' are positioned to ride upon the inside surface of the bottom and top walls of housing 20, as described hereinafter (see FIG. 4), these walls providing bearing tracks for permitting easy movement of the frame inwardly and outwardly when the drop axle structure is adjusted laterally to change the width of the spacing between the ground engaging wheels.

Referring to FIGS. 2 and 3, it will be seen that the two tubular members 24 and 26 of the several frame elements are fitted inside their respective housing support means to pass close to the vertical walls 30 and 32 of the housing means 20. The cooperative housing means and frame elements confine the movement of the drop axles to which the frame is attached to essentially the lateral movement used for adjusting the width of the spacing between the wheels to the required spacing to fit the row crop to be treated. After a proper setting has been established, a clamping device is operative to frictionally bind the frame integral with the housing.

The clamping means includes the rigid threaded female element 34, (see FIG. 3), mounted integrally with housing 20 for cooperating with the threaded stud 36 to engage a V-shaped clamp 38 against the V-shaped wall of the square tube 24 when the threaded stud 36 is driven inwardly. As the V-shaped clamp element 38 is driven inwardly, it forces the frame integral with the drop axle to move to engage frictionally against wall 30 of the housing so that the ridge of the square tubular member 26 is driven into contact with the valley of the V-shaped wall 30 on the other side of the housing 20. The wall 30 acts like a cam together with clamp 38 to engage the frame members 24 and 26 to center the frame vertically in the housing 20 and when the frame is thus clamped in the housing 20, the rollers 32' and 30' are moved away from engagement with the top and bottom housing walls as shown in FIG. 5 or bearing track means provided on the inside of the housing so that the frame and housing are integrally fitted together to hold the drop axle in that adjusted or clamped position with the bearings 30' and 32' out of contact with their respective bearing tracks.

The clamp 38 has a rear wall structure including guides 42 and 44 that engage against the wall 32 when the clamp is retracted to hold the clamp in a position free from the V-shaped wall of bar 24, but it loosely fits the V-shaped face of bar 24 to act as a guide as the frame element is adjusted laterally. Clamp 38 includes a further guide bearing 46 that engages in aperture 48 to position the clamp 38 inside the housing with the valley of its V aligned parallel with the valley of the V-shaped wall 30 that it faces.

On the underside of housing 20 a bracket 49 is welded in a position as shown in FIGS. 4 and 5, to support a hydraulic motor 50 at one end with the other end of the hydraulic motor being adapted to be connected to a cooperating fitting 52 mounted integral with the upper inside portion of the drop axle structure. When it is necessary to adjust the ground engaging wheels laterally of the vehicle to change the width or spacing between the wheels, the clamp 38 is retracted by operation of stud 36, thereby freeing the tubular frame members 24 and 26 from their clamped position within housing 20. This allows the weight of the vehicle, transmitted by drop axles 14 and 16, to rock the tubular frame members 24 and 26 within housing 20 to the position shown in FIG. 4 so that the pairs of bearings 30' and 32' move into engagement with the bottom and top walls of housing 20, respectively, or their bearing tracks and the hydraulic motor is connected between the bracket 49 and fitting 52. The vehicle is then slowly driven forward while hydraulic fluid under pressure is delivered to motor 50 so that the drop axle supported on the pairs of bearings 30 and 32 carried by the frame element, is moved inwardly or outwardly in the housing to the desired position. Suitable markings may be applied to the frame elements to indicate the spacing for the wheels at any given position and once the drop axle has been adjusted laterally to the position in which the ground wheel is properly situated to move through the space between the particular row crop to be treated, the clamp 38 is driven inwardly to engage against the tube 24 to move and center it and drive the other bar 26 into the V-shaped wall 30 on the other side of the housing so that members 24 and 26 are again centered within housing 20 as shown in FIG. 5. The clamp element mounted on wall 32 together with the wall 30 act as cam means to lift the frame into a fixed horizontal position in the housing with the ridge of the tube 26 and the ridge of the tube 24 tightly engaged in the wall 30 and clamp 38 so that the pairs of bearings 30' and 32' are disengaged from contact with the bearing tracks on the inside of the housing 20. When the clamp is released, adjustment of the frame within the housing may be made while slowly driving the vehicle across the ground so the ground engaging wheel does not scrub against the soil and so that no bending forces are generated within the housing and drop axle means. When the machine is being adjusted to fit the rows of a particular crop, each wheel is separately adjusted to its desired lateral position and upon being clamped, the vehicle is ready for spraying operation. It should be noted, however, that while making the adjustment of the front wheels which are normally the steering wheels for such a vehicle, the telescopically adjustable tie rod 60 for the steering system shown in FIGS. 1 and 2 must first be pinned to the upper end of its respective drop axle 14. For this purpose, each steering arms 61 integral with the steering mechanism (not shown) connected to the front end ground engaging wheels 12 has an aperture 62 which is adapted to be positioned over a cooperating aperture in lugs 64 integral with the upper ends of the front drop axle housings 14. The steering system is locked in the straight ahead position when a suitable pin 66 is dropped through the aperture 62 and engaged in the aperture in lug 64, whereupon the telescopic elements of tie rod 60 may be disconnected by removal of the bolts 68 so that the separate elements of the tie rod may slide one with respect to the other as the drop axle for each of the front wheels is adjusted laterally as the vehicle is driven slowly over the ground. When the ground engaging wheels have first one and then the other been positioned properly in the desired lateral position, and the telescopic sections of the tie rod have been permanently joined together by driving bolts 68 home and then the pins retracted from aperture 62 and lug 64, the tie rod of the steering system will have been automatically adjusted to the straight head position simultaneously with lateral adjustment of the drop axles.

Power is continuously delivered to the rear ground engaging wheels from drive axle 70 which receives power from the motor on the platform 10. Axle 70 has a hexagonal shape and is connected by a sliding fit with a suitable hexagonal slide bearing integral with driving means at the top end of the rear drop axle. The hexagonal drive shaft 70 rotates the drive means and by either a suitable sprocket chain or gear drive arrangement, the ground engaging wheels are powered through the field.

With this structure, it is seen that all 4 wheels may be adjusted one at a time as desired without requiring the vehicle to be jacked or requiring use of special tools for accomplishing the desired adjustment. Each wheel is adjusted independently and suitable markings can be provided on the frame structure of each drop axle so that as it moves inwardly or out of the housing, the desired adjusted width can be accomplished. The single hydraulic motor may be easily connected between each drop axle and the platform as adjustment is being made so that a very simple adjustable drop axle arrangement is shown for making a high clearance vehicle easily and readily adaptable for spraying row crops which have been set out at varying widths between their rows.

The above describes a preferred form of my invention and it is possible that modifications thereof may occur to those skilled in the art which will fall within the scope of the following Claims.

What I claim is:

1. A self-propelled, high-clearance vehicle comprising a platform, a plurality of drop axles, a ground engaging wheel mounted at the lower end of each of said drop axles, drive means for driving said vehicles and means connecting the upper end of each of said drop axles to said platform for adjusting the lateral position of the drop axles and ground engaging wheels, wherein each of said adjusting means comprises support means secured to said platform and a cooperating laterally adjustable element secured to the drop axle for each of said wheels, said laterally adjustable elements having bearings secured thereto, said bearings adapted to engage said support means during lateral adjustment of said laterally adjustable elements, means for moving each of the laterally adjustable elements within said support means on said bearings relative to said platform and holding means for holding said laterally adjustable element in a fixed stationary adjusted position relative to said platform and co-acting with each of said laterally adjustable elements and said support means to disengage said bearings from their engagement with said support means after adjustment.

2. A structure as in claim 1 wherein said drive means comprises laterally extending drive shafts connected to at least the rear drop axles, said drop axles being drivingly connected to their respective wheels, wherein said shafts are slidably connected to said drive means for transmitting power to the rear ground engaging wheels in all of their laterally adjusted positions.

3. A structure as claimed in claim 1 wherein said pair of front ground engaging wheels of the front drop axles are adapted for turning for steering the vehicle, and wherein said vehicle further includes a laterally extendable and contractable tie bar for adjustably connecting said pair of front wheels together, locking means for locking said tie bar to each of said front drop axles while each drop axles is being laterally adjusted and steering means for steering said vehicle connected to said tie bar.

4. A structure as claimed in claim 1 wherein said holding means includes clamp means adapted to permit lateral movement when in an unclamped condition and to lock said elements to said support means when in a clamped condition and simultaneously co-acting with said laterally adjustable elements and said support means to disengage said bearings from their engagement with said support means.

5. A structure as in claim 1 wherein each of said support means is a rigid housing fixed to the platform and each of said laterally adjustable elements is a rigid frame integral with its respective drop axle, each said frame being slidingly and telescopically fitted into its respective housing and said holding means is a clamp means that simultaneously co-acts with said laterally adjustable element and its respective support to disengage said bearings from contact with said support means.

6. A structure as in claim 5 further including cam means in each of said housings for engaging a cooperative member on said laterally adjustable element, and said clamp means when in a clamped condition is operative to effect movement of said cooperative member relative to said cam means so as to center said frame within said housing thereby disengaging said bearing means from said support means.

7. A structure as in claim 6 wherein said cam means in said housing comprises a V-shaped wall and each said frame has a V-shaped nose interfitting therewith and said clamp means is operative to drive said V-shaped nose into said V-shaped wall to act as a cam operative to disengage said bearing means from said support means.

8. A structure as in claim 5 in which the platform has a longitudinal axis disposed along the direction in which the vehicle moves and a lateral width at right angles thereto and wherein said housing has elongated horizontal dimensions both in the direction laterally of the platform and longitudinally thereof, and a V-shaped wall on one side of said housing for integrally connecting the top and bottom walls of the housing, and said frame has corresponding elongated horizontal dimensions in both of said directions with a V-shaped wall for closely interfitting with the V-shaped wall of said housing, and said clamp means being operative to effect a slight longitudinal movement of said frame horizontally in said housing to in one position hold said V-shaped walls in tight frictional engagement whereby to position said frame in the housing with the bearing means disengaged from said support means and in another position to release said V-walls from frictional engagement whereby to permit said bearing means to re-engage said support means.

9. A structure as in claim 8 wherein each of said frames loosely fits within its respective housing and each frame has a plurality of horizontally and vertically spaced apart bearing means for cooperating with correspondingly horizontally and vertically spaced apart tracks in each of the respective housings, the lower most bearing means being spaced inwardly nearer the longitudinal center of the platform of the vehicle and the uppermost bearing means being spaced outwardly from the longitudinal center of the platform and the lower bearing means, and said clamp means being operative to align the bottom ridges of said V-walls together during said tight frictional engagement to cause said spaced apart bearing means to be disengaged from their respective track means.

10. An improved self-propelled, high-clearance vehicle comprising a platform, front and rear drop axles having wheels mounted on the lower end of said drop axles, at least one support member being located on the front of said platform, at least one support member being located on the rear of said platform, adjustable elements secured to the upper end of each of said front and rear drop axles and being slidingly retained by said front and rear support members, respectively, each of said adjustable elements having bearings secured thereto, said bearings being adapted to engage said support members during lateral adjustment of said elements, means for locking each of said elements on its respective support member at a desired position and for vertically centering each of said elements to its respective support member so as to hold said bearings out of contact with said support member and means for moving each of said elements laterally with respect to the support member with which it is associated.

11. An improved self-propelled, high-clearance vehicle comprising a platform, front and rear drop axles having wheels mounted on the lower end of said drop axles, at least one support member being located on the front of said platform and at least one support member being located on the rear of said platform, adjustable elements secured to the upper end of each of said front and rear drop axles and being slidingly retained by said front and rear support members, respectively, bearing means mounted between said elements and said support members, said bearing means adapted to engage said support members so as to provide a sliding engagement between said elements and said support members during lateral adjustment of said elements, means for locking each of said elements on its respective support member at a desired position and for vertically centering each of said elements to its respective supply member so as to hold said bearing means out of sliding engagement between said elements and said support members, and means for moving each of said elements laterally with respect to the support member with which it is associated.

* * * * *